Figure 2:
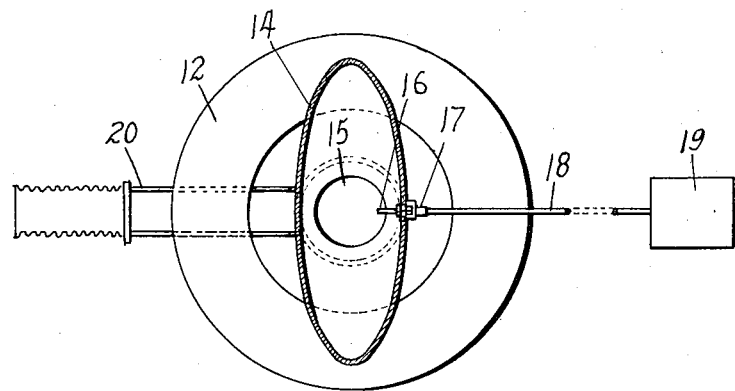

June 21, 1966  J. DELCROIX ETAL  3,257,579
PARTICLE-CONFINING DEVICES HAVING MAGNETIC MIRRORS
Filed April 7, 1960  3 Sheets-Sheet 1
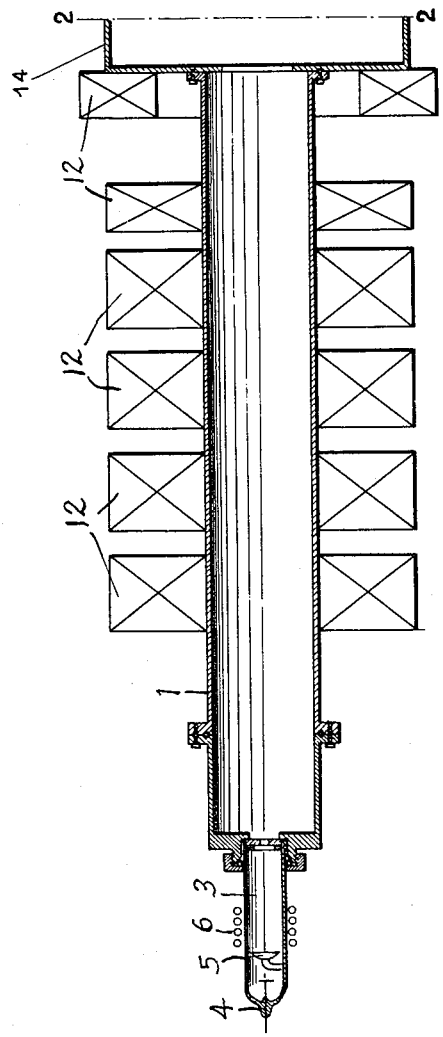
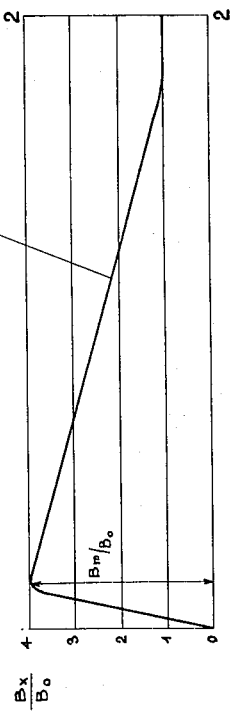
INVENTORS
J. DELCROIX and D. QUEMADA
BY *Craig and Freudenberg*
ATTORNEY June 21, 1966  J. DELCROIX ETAL  3,257,579
PARTICLE-CONFINING DEVICES HAVING MAGNETIC MIRRORS
Filed April 7, 1960  3 Sheets-Sheet 2
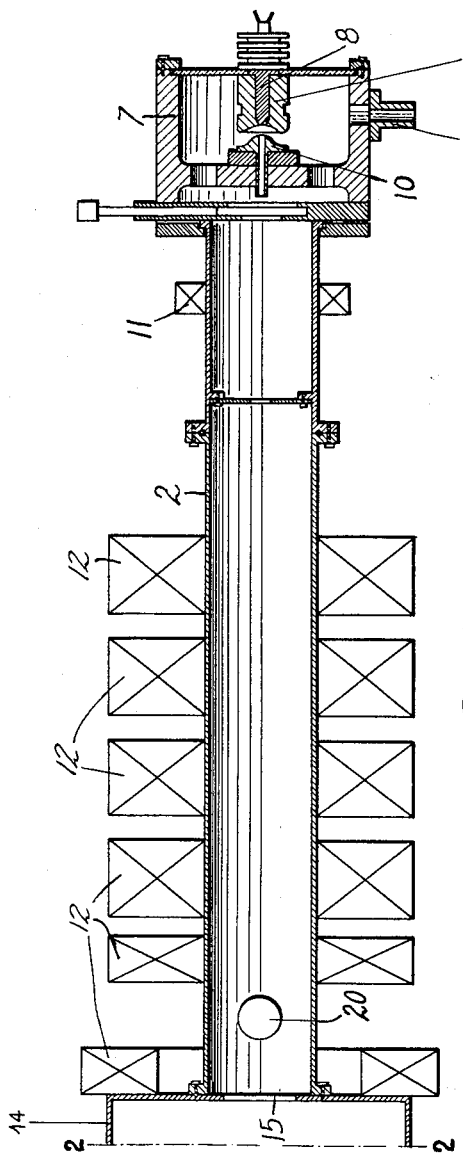
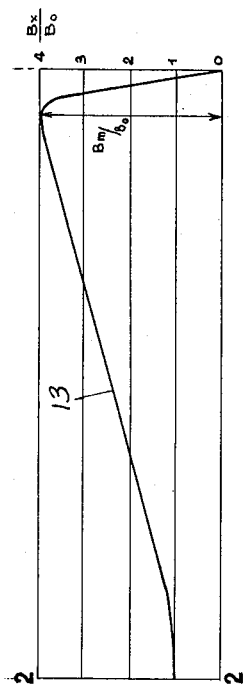
INVENTORS
J. DELCROIX and D. QUEMADA
BY Craig and Freudenberg
ATTORNEY

United States Patent Office 3,257,579
Patented June 21, 1966

3,257,579
PARTICLE-CONFINING DEVICES HAVING MAGNETIC MIRRORS
Jean Delcroix and Daniel Quemada, Paris, France, assignors to Compagnie Generale de Telegraphie Sans Fil, Paris, France
Filed Apr. 7, 1960, Ser. No. 20,704
Claims priority, application France, May 4, 1959, Patent 793,826
16 Claims. (Cl. 315—111)

The present invention relates to devices wherein the elementary particles of matter of a given type or of several types in mixture are confined within a region of the inner space of an evacuated vessel or enclosure, insulated from the walls of this vessel.

More particularly, the present invention relates to the type of such devices wherein this confinement is effected by a longitudinal magnetic field parallel to the walls of the aforementioned vessel and, in particular, to devices having so-called "magnetic mirrors," in other words, to devices in which this longitudinal field is uniform between two regions of constriction of the lines of force thereof. In each of these regions, a plane normal to the longitudinal field is established which constitutes a magnetic mirror reflecting the charged particles which move thereagainst, irrespective of the sign thereof. The entirety of the lines of force of the longitudinal field together with the constrictions at the extremities thereof define a so-called "magnetic bottle" which surrounds the particles and which compresses the same within the region of confinement thereof.

It is known that the tightness of the conventional magnetic bottles is imperfect. In fact, when the intensity of the magnetic field within the region of the mirror is designated by $B_m$ and the intensity of the magnetic field within the region between the mirrors with $B_0$, and by designating by $E_1$ and $E_2$ the kinetic energies of the particles, respectively, in the direction parallel and perpendicular to the field $B_0$, the following condition is known:

$$\frac{E_1}{E_2} \leq \frac{B_m}{B_0} \quad (1)$$

under which the particles in the interior of the magnetic bottle are reflected by the mirrors. If this condition is not met or satisfied for certain particles, the latter will escape through so-called "plugs" of the magnetic bottle, formed by the magnetic mirrors.

For practical purposes, however, there is a limit beyond which the ratio $B_m/B_0$ cannot be increased. In view of the fact that, in the known devices, $E_2$ is generally small, as compared to $E_1$, the aforementioned condition is not met or satisfied for a large part of the particles even with the greatest possible value of the ratio $B_m/B_0$, so that these particles will escape through the "plugs."

The present invention is directed to a device having magnetic mirrors for the confinement of particles, wherein the abovementioned drawback is eliminated and the tightness of the magnetic bottle is improved.

The present invention is characterized by the fact that the energy $E_2$ of the particles in the planes perpendicular to the magnetic field of confinement is increased, particularly by establishing within the central part of the bottle a cavity resonator which is excited by a high frequency field to the resonant frequency thereof and wherein the desired particles effecting a reciprocating or to-and-fro movement between the reflecting mirrors enter in cyclotron resonance.

As a consequence of this improved tightness, the density of the particles, which are continuously injected into the bottle by an appropriate source, increases within the interior of the bottle since the escape thereof is greatly reduced, which fact is of interest for a great number of industrial applications.

When the increase in density affects or concerns the ions of a predetermined type or species, either alone or in mixture with other species or with electrons for forming the plasma, it is known that this constitutes a favorable condition for the generation of energy by reactions of thermonuclear fusion.

On the other hand, when the increase in density affects or concerns the electrons, for example, within the body or center of a plasma, it is known that this constitutes a favorable condition for inducing and maintaining oscillations of the plasma, which permits the use of the device as an oscillation generator.

In all the cases, the gain derived from the increase in density permits a reduction in the energy level applied to the injected particles which fact, on the one hand, simplifies the construction and reduces the cost of the sources of these particles and, on the other hand, decreases the longitudinal energy $E_1$ thereby providing a supplementary contribution to the improvement of the tightness of the magnetic bottle.

Accordingly, it is an object of the present invention to provide a particle-confining device of the type mentioned hereinabove and provided with magnetic mirrors which eliminates the aforementionad drawbacks and shortcomings of the prior art devices by improving the tightness of the resulting so-called magnetic bottle.

It is another object of the present invention to provide a particle-confining apparatus of the type described hereinabove in which the inadvertent and undesired escape of particles from the device is considerably reduced.

Still a further object of the present invention is the provision of a particle-confining device constituting a magnetic bottle which permits use thereof as an oscillation generator.

Another object of the present invention is a provision of a particle-confining device effectively constituting a magnetic bottle which offers the advantages of simplified construction and reduced cost, particularly insofar as the particle sources thereof are concerned.

A further object of the present invention resides in the provision of a particle-confining device in which a synergistic effect is obtained with respect to the tightness of the magnetic bottle and the simplification and lowering of the cost in connection with the particle sources used therein.

These and further objects, features and advantages of the present invention will become more obvious from the following description when taken in connection with the accompanying drawing which shows, for purposes of illustration only, one embodiment in accordance with the present invention and wherein FIGURES 1a and 1b are longitudinal cross-sectional views, respectively, of the left- and right-hand portions through a device according to the present invention, these partial views being connected along line 2—2;

FIGURE 2 is a transverse cross-sectional view of the device taken along line 2—2; and FIGURES 3a and 3b are, respectively, the left and right hand portions of the diagram of distribution of the intensity relative to the magnetic field along the longitudinal axis of the device of FIGURES 1a and 1b, these partial views 3a and 3b being connected again along line 2—2.

The device according to the present invention comprises a cylindrical enclosure composed of two cylinders 1 (FIGURE 1a) and 2 (FIGURE 1b), for example, made of Duralumin. An ion gun 3 is disposed at the left hand extremity of the enclosure (FIGURE 1a), which gun 3 comprises an extraction electrode 4, a shield 5, and an ionization coil 6. The gun is supplied with a suitable gaseous medium through a pipe (not shown). The structure of this gun is known per se in the prior art so that it is believed unnecessary herein to further describe the same, it being also understood that any equivalent ion gun may be substituted for the one shown herein.

An electron gun 7 is provided at the right extremity of the enclosure (FIGURE 1b), which electron gun 7 comprises a cathode 8, a Wehnelt electrode 9 and an anode 10. These electrodes are carried at or brought to appropriate potentials by conventional sources (not shown) in order to inject into the interior of the enclosure 1, 2 a beam of electrons which is focused by a magnetic lens 11. As is the case for the ion gun, the structure of the electron gun is well known per se in the art, and any equivalent construction may be substituted for the one shown herein.

The enclosure 1–2 is surrounded by a plurality of coils 12 the dimensions, number of windings and consequently currents of which are adjusted in such a manner as to obtain, along the device, the distribution of relative intensity of the magnetic field at the interior of the enclosure, as illustrated by the curve 13 (FIGURES 3a and 3b). The ordinates of this curve represent the ratio $B_x/B_o$, wherein $B_o$ defines the intensity of the magnetic field in the plane 2—2 or its vicinity, while $B_x$ designates the intensity of the magnetic field at any point along the axial ordinate of the device. It is evident that the curve 13 has the form of an "arch," a form currently utilized in the known devices having magnetic mirrors, these mirrors being formed within the regions of maxima $B_m/B_o$ of the curve at the two extremities of the device.

According to the present invention, the enclosure or vessel of the device is provided with a cavity resonator 14 inserted between cylinders 1 and 2. This cavity 14 is permeable at 15 to the electrons and ions moving within the enclosure. The cavity 14 also resonates at a frequency $f$, and the magnetic field $B_o$ at the interior of the cavity 14 is related to the frequency $f$ by the equation of cyclotron resonance:

$$f = \frac{1}{2\pi} \cdot \frac{e}{m} \cdot B_o \qquad (2)$$

wherein $e$ and $m$ are the charge and mass, respectively, of the particle the density increase of which is desired, particularly of the electron in the actual case; $f$ is in cycles per second if $e$, $m$ and $B_o$ are in homogeneous units.

The cavity 14 is made, for example, in the form of an elliptical cylinder, as seen in cross section in FIGURE 2. It is excited, for instance, by an antenna 16 which projects laterally from a tight, insulating passage 17 and which is connected to a source of $f$ frequency 19 by a feeder 18.

The enclosure 1–2 of the device in accordance with the present invention is also connected to a conventional pumping device by means of conduit 20, whereas the enclosure of gun 7 is connected to another pumping device by means of conduit 21.

OPERATION

The operation of the device in accordance with the present invention is as follows:

The electrons, which are injected into enclosure 2 by means of gun 7 and focused by lens 11, enter the cavity 14 with a transverse speed which is quasi zero. Due to the cyclotron resonance, these electrons acquire a certain transverse speed while being within the cavity, and by suitably selecting the energy with which the electrons are injected it becomes possible to achieve that practically all the electrons possess, upon leaving the resonator, a transverse speed of the same magnitude and the same azimuth, essentially independently of the phase of the high frequency field at the instant of entry of the electron into the resonator. Upon leaving the resonator, the electrons propagate toward the left hand side of the device and are reflected by the magnetic mirror adjacent the ion gun 3, whereby it is assumed that the acquired speed is sufficient to impart to these electrons a condition which prevents their escape, as discussed hereinabove.

The reflected electrons thus reappear at the input of resonator 14 and their velocity is then equal to that which they had when leaving the resonator. Nevertheless, the azimuth of this velocity differs generally from that of the velocity of the electrons which had previously left the resonator. Thus, a phase difference results between the velocity vector and the high frequency electric field, and the different electrons, therefore, appear at the input of the resonator 14 with an entire spectrum of such dephasings or phase displacements. Within this spectrum, certain phase displacements are favorable, while others are unfavorable to the return into cyclotron resonance of the electrons within the cavity 14. The electrons of this last-mentioned category will thus lose in the fro-motion the transverse velocity they had acquired in the to-motion and will thus escape through the plug of the magnetic bottle at the right hand side of the device.

Experience, however, has indicated that by acting experimentally upon the shape of the curve 13, it is possible that a relatively high number of electrons appears at the input of the resonator 14 with such dephasing that they once again enter in cyclotron resonance at the interior of the cavity. This action on the curve 13 may be obtained by any desired measure, such as the adjustment of the intensity of the high frequency field, of the form, number of windings of the coils, of the current traversing the latter, etc. The electrons of this category will, therefore, leave the resonator 14 with an even greater transverse speed and will thus be reflected by the magnetic mirror adjacent the electron gun.

In the same manner, if the preceding action upon the distribution curve of the field has been sufficiently refined, it becomes possible that among these electrons reflected by the magnetic mirror at the right hand side and thereupon entering anew the resonator 14, a relatively great number enters again into resonance and is subjected to a new increase in transverse speed, whereas other electrons, even if they lose part of that speed, still preserve a transverse velocity sufficient to satisfy the condition of preventing their escape through the left extremity of the magnetic bottle. The same possibility applies to each consecutive passage of the electrons through the resonator 14. It is thus obvious that the device according to the present invention permits to maintain a to-and-fro circulation of a relatively important fraction of the flux of injected electrons between the mirrors to the right and left at the interior of the enclosure 1–2. Since the injection of electrons functions at the same time either continuously or in a pulsed manner, the density of electrons at the interior of the enclosure 1–2 will gradually increase, the limitation being naturally imposed by the equilibrium obtained between the admission and the inevitable losses due to whatever causes.

It has been found experimentally that favorable results from the point of view of increase of electron density may be obtained with a frequency $f$ of the order of 3 kmc./s. and a field $B_o$ of the order of 1000 gauss, the field $B_m$ within the regions of the mirrors being then of the order of 2500 gauss. The electrons could then be injected with an energy of 140 e.v., in other words, by means of an electron gun of simple construction which presents no difficulty of technological realization.

The space charge created by the electrons is neutralized by the ions furnished by gun 3 in such a manner that at the interior of the enclosure 1-2 a plasma is formed which is confined by the magnetic field within the inner region of the enclosure, without contact with the walls thereof, and which is susceptible of entering into oscillations.

In case it is desired to utilize these plasma oscillations, suitable means which are well known to those skilled in the art will be provided for picking up the plasma oscillations and transmitting the same to the utilization or load circuits.

While we have shown and described one embodiment in accordance with the present invention it is understood that the same is not limited thereto but is susceptible of many changes and modifications within the spirit and scope of the present invention. For example, the present invention is also applicable to achieve density increase of particles other than electrons by suitably selecting the parameters in Formula 2 for the cyclotron resonance. Additionally, the present invention is not limited to the particular shape and type of cavity illustrated herein which may be of any shape known in the art and suitable for the purposes of the present invention.

Thus, it is quite obvious that the present invention is capable of many modifications and we therefore do not wish to be limited to the details shown and disclosed herein but intend to cover all such changes and modifications thereof as are encompassed by the scope of the appended claims.

What is claimed is:

1. A plasma confinement device comprising an elongated evacuated vessel including two cylinders effectively communicating with each other through a body electrically forming a resonant circuit at a predetermined ultra-high frequency, means for separately injecting into said vessel ions and electrons constituents of said plasma, means for producing in said vessel a substantially longitudinal, time-constant magnetic field whose intensity increases from a minimum essentially at the middle of the vessel to a maximum value near the ends thereof, and means for producing in said circuit ultra-high frequency electromagnetic oscillations of substantially said predetermined frequency, the said minimum magnetic field intensity being so interrelated with the charge and the mass of desired particles within said plasma that the cyclotron resonance frequency of said particles is substantially equal to said predetermined frequency.

2. A plasma confinement device comprising an elongated evacuated vessel including two cylinders effectively communicating with each other through a cavity resonator resonant at a predetermned ultra-high frequency, means for separately injecting into said vessel ions and electrons constituents of said plasma, means for producing in said vessel a substantially longitudinal, time-constant magnetic field whose intensity increases from a minimum essentially at the middle of the vessel to a maximum value near the ends thereof, and means for producing in said cavity resonator ultra-high frequency electromagnetic oscillations of substantially said predetermined frequency, the said minimum magnetic field intensity being so interrelated with the charge and the mass of desired particles within said plasma that the cyclotron resonance frequency of said particles is substantially equal to said predetermined frequency.

3. A plasma confinement device comprising an elongated evacuated vessel including two cylinders effectively communicating with each other through a body electrically forming a resonant circuit at a predetermined ultra-high frequency, means for separately injecting into said vessel respectively through opposite extremities of said cylinders ions and electrons constituents of said plasma, means for producing in said vessel a substantially longitudinal, time-constant magnetic field whose intensity increases from a minimum essentially at the middle of the vessel to a maximum value near the ends thereof, and means for producing in said circuit ultra-high frequency electromagnetic oscillations of substantially said predetermined frequency, the said minimum magnetic field intensity being so interrelated with the charge and the mass of desired particles within said plasma that the cyclotron resonance frequency of said particles is substantially equal to said predetermined frequency.

4. A plasma confinement device comprising an elongated evacuated vessel including two cylinders effectively communicating with each other through a body electrically forming a resonant circuit at a predetermined ultra-high frequency, means for separately injecting into said vessel ions and electrons constituents of said plasma, means for producing in said vessel a substantially longitudinal, time-constant magnetic field whose intensity increases from a minimum essentially at the middle of the vessel to a maximum value near the ends thereof, and means for producing in said circuit ultra-high frequency electromagnetic oscillations of substantially said predetermined frequency, the said minimum magnetic field intensity $B_0$ being interrelated with the charge $e$ and the mass $m$ of desired particles within said plasma and with said predetermined frequency $f$ in such a manner as to substantially satisfy the following equation:

$$2\pi f = e/m \cdot B_0$$

5. A plasma confinement device comprising an elongated evacuated vessel including two cylinders effectively communicating with each other through a body electrically forming a resonant circuit at a predetermined ultra-high frequency, means for separately injecting into said vessel ions and electrons constituents of said plasma, means for producing in said vessel a substantially longitudinal, time-constant magnetic field whose intensity increases from a minimum essentially at the middle of the vessel to a maximum value near the ends thereof, and means for producing in said circuit ultra-high frequency electromagnetic oscillations of substantially said predetermined frequency, the minimum magnetic field intensity being so interrelated with the charge and the mass of desired particles within said plasma that the cyclotron resonance frequency of said particles is substantially equal to said predetermined frequency, means being provided for adjusting the intensities of said magnetic field between said minimum and maximum values to obtain an optimum density of said desired particles in said vessel.

6. A plasma confining device comprising essentially evacuated enclosure means including resonant circuit means, means for separately injecting into said enclosure means ion and electron constituents of said plasma in such a manner as to pass through said resonant circuit means, means for exciting said resonant circuit means substantially at a cyclotron resonance frequency of desired particles within said plasma in a predetermined magnetic field, and means including a source of said predetermined magnetic field effectively constituting a magnetic bottle for said plasma within said enclosure means, whereby escape of said desired particles from said bottle is effectively prevented.

7. A plasma confining device comprising essentially evacuated enclosure means including resonant circuit means resonant at a frequency $f$, means for separately injecting into said enclosure means ion and electron constituents of said plasma in such a manner as to pass through said resonant circuit means, means for exciting said resonant circuit means substantially at a cyclotron resonance frequency of desired particles having a charge $e$ and a mass $m$ within said plasma in a predetermined magnetic field $B_0$, substantially interrelated with said frequency $f$ by the relation $2\pi f = e/m \cdot B_0$, and means comprising a source of said predetermined magnetic field effectively constituting a magnetic bottle for said plasma within said enclosure means, whereby escape of said desired particles from said bottle is effectively prevented.

8. A plasma confining device comprising essentially evacuated enclosure means, means for injecting separately ion and electron constituents of said plasma into said enclousure means, means effectively constituting a magnetic bottle for said plasma within said enclosure means, and means improving the tightness of said magnetic bottle to prevent escape therefrom of desired particles contained in said plasma including a body electrically forming a resonant circuit means in communication with said enclosure means in such a manner as to enable the electromagnetic waves adapted to be set up in said resonant circuit means to act on said particles in the resonance condition between said wave frequency, said circuit means and cyclotron gyration of said particles.

9. A plasma confinement device comprising an elongated evacuated vessel including two cylinders effectively communicating with one another through a body electrically forming a resonant circuit at a predetermined ultra-high frequency, means for separately injecting into said vessel ions and electrons constituents of said plasma, means for producing in said vessel a substantially longitudinal, time-constant magnetic field whose intensity increases from a minimum essentially at the middle of the vessel to a maximum value near the ends thereof, and means for producing in said circuit ultra-high frequency electromagnetic oscillations of substantially said predetermined frequency, the said minimum magnetic field intensity being so interrelated with the charge and the mass of electrons within said plasma that the cyclotron resonance frequency of said electrons is substantially equal to said predetermined frequency.

10. A plasma confinement device comprising an elongated evacuated vessel including two cylinders effectively communicating with one another through a cavity resonator resonance at a predetermined ultra-high frequency, means for separately injecting into said vessel ion and electron constituents of said plasma, means for producing in said vessel a substantially longitudinal, time constant magnetic field whose intensity increases from a minimum essentially at the middle of the vessel to a maximum value near the ends thereof, and means for producing in said cavity resonator ultra-high frequency electromagnetic oscillations of substantially said predetermined frequency, the said minimum magnetic field intensity being so interrelated with the charge and the mass of electrons within said plasma that the cyclotron resonance frequency of said electrons is substantially equal to said predetermined frequency.

11. A plasma confinement device comprising an elongated evacuated vessel including two cylinders effectively communicating with each other through a body electrically forming a resonant circuit at a predetermined ultra-high frequency, means for separately injecting into said vessel respectively through opposite extremities of said cylinders ion and electron constituents of said plasma, means for producing in said vessel a substantially longitudinal, time constant magnetic field whose intensity increases from a minimum essentially at the middle of the vessel to a maximum value near the ends thereof, and means for producing in said circuit ultra-high frequency electromagnetic oscillations of substantially said predetermined frequency, the said minimum magnetic field intensity being so interrelated with the charge and the mass of electrons within said plasma that the cyclotron resonance frequency of said electrons is substantially equal to said predetermined frequency.

12. A plasma confinement device comprising an elongated evacuated vessel including two hollow members effectively communicating with each other through a body electrically forming a resonant circuit to a predemined ultra-high frequency, means for separately injecting into said vessel ion and electron constitutents of said plasma, means for producing in said vessel a substantially longitudinal, time-constant magnetic field whose intensity increases from a minimum essentially at the middle of the vessel to a maximum value near the ends thereof, and means for producing in said circuit ultra-high frequency electromagnetic oscillations of substantially said predetermined frequency, the said minimum magnetic field intensity $B_0$ being interrelated with the charge $e$ and the mass $m$ of electrons within said plasma and with said predetermined frequency $f$ in such a manner as to substantially satisfy the following equation:

$$2\pi f \times e/m \cdot B_0$$

13. A plasma confinement device comprising an elongated evacuated vessel including two cylinders effectively communicating with one another through a body electrically forming a resonant circuit at a predetermined ultra-high frequency, means for separately injecting into said vessel ion and electron constituents of said plasma, means for producing in said vessel a substantially longitudinal, time-constant magnetic field whose intensity increases from a minimum essentially near the middle of the vessel to a maximum value near the ends thereof, and means for producing in said circuit ultra-high frequency electromagnetic oscillations of substantially said predetermined frequency, the minimum magnetic field intensity being so interrelated with the charge and the mass of electrons within said plasma that the cyclotron resonance frequency of said electrons is substantially equal to said predetermined frequency, means being provided for adjusting the intensities of said magnetic field between said minimum and maximum values to obtain an optimum density of said electrons in said vessel.

14. A plasma confining device comprising essentially evacuated enclosure means including resonant circuit means, means for separately injecting into said enclosure means ion and electron constituents of said plasma in such a manner as to pass through said resonant circuit means, means for exciting said resonant circuit means substantially at a cyclotron resonance frequency of electrons within said plasma in a predetermined magnetic field, and means comprising a source of said predetermined magnetic field effectively constituting a magnetic bottle for said plasma within said enclosure means, whereby escape of said electrons from said bottle is effectively prevented.

15. A plasma confining device comprising essentially evacuated enclosure means including resonant circuit means resonant at a frequency $f$, means for separately injecting into said enclosure means ion and electron constituents of said plasma in such a manner as to pass through said resonant circuit means, means for exciting said resonant circuit means substantially at a cyclotron resonance frequency of electrons having a charge $e$ and a mass $m$ within said plasma in a predetermined magnetic field $B_0$, substantially interrelated with said frequency $f$ by the relation $2\pi f = e/m \cdot B_0$, and means including a source of said predetermined magnetic field effectively constituting a magnetic bottle for said plasma within said enclosure means, whereby escape of said electrons from said bottle is effectively prevented.

16. A plasma confining device comprising essentially evacuated enclosure means, means for injecting separately ion and electron constituents of said plasma into said enclosure means, means effectively constituting a magnetic bottle for said plasma within said enclosure means, and means improving the tightness of said magnuetic bottle to prevent escape therefrom of electrons contained in said plasma including a body electrically forming resonant circuit means in communication with said enclosure means in such a manner as to enable the electromagnetic waves adapted to be set up in said resonant circuit means to act on electrons in the resonance condition between said wave frequency, said circuit means and cyclotron gyration of said electrons.

(References on following page)

References Cited by the Examiner

UNITED STATES PATENTS

| | | | |
|---|---|---|---|
| 2,892,114 | 6/1959 | Kilpatrick | 315—111 X |
| 2,920,236 | 1/1960 | Chambers et al. | 313—231 X |
| 2,927,232 | 3/1960 | Luce | 313—161 X |
| 2,940,011 | 6/1960 | Kolb | 313—231 X |
| 2,946,914 | 7/1960 | Colgate et al. | 313—161 X |
| 3,005,767 | 10/1961 | Boyer et al. | 315—111 X |
| 3,005,931 | 10/1961 | Dandl | 313—231 X |

GEORGE N. WESTBY, *Primary Examiner.*

ARTHUR GAUSS, *Examiner.*

V. LAFRANCHI, *Assistant Examiner.*